US012028369B2

(12) United States Patent
Rajasekharan et al.

(10) Patent No.: US 12,028,369 B2
(45) Date of Patent: Jul. 2, 2024

(54) COMPRESSION OF USER INTERACTION DATA FOR MACHINE LEARNING-BASED DETECTION OF TARGET CATEGORY EXAMPLES

(71) Applicant: AT&T Intellectual Property I, L.P., Atlanta, GA (US)

(72) Inventors: Vivek Rajasekharan, Plano, TX (US); Seyed Amir Mir Bagheri, Dallas, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 464 days.

(21) Appl. No.: 17/330,029

(22) Filed: May 25, 2021

(65) Prior Publication Data

US 2022/0385689 A1     Dec. 1, 2022

(51) Int. Cl.
*H04L 9/40* (2022.01)
*G06N 3/044* (2023.01)
(Continued)

(52) U.S. Cl.
CPC ......... *H04L 63/1458* (2013.01); *G06N 3/044* (2023.01); *G06N 3/08* (2013.01); *H04L 63/1425* (2013.01); *H04L 67/1396* (2022.05)

(58) Field of Classification Search
CPC ............. H04L 63/1441; H04L 63/1483; H04L 63/145; H04L 63/1425; H04L 63/101;
(Continued)

(56) References Cited

U.S. PATENT DOCUMENTS 11,044,199 B2 * 6/2021 Pfister .................... G06N 3/088
11,463,475 B1 * 10/2022 Colon ............... H04M 3/42195
(Continued)

FOREIGN PATENT DOCUMENTS

AU     2020203862 B2 * 8/2021 .......... G06F 18/2113

OTHER PUBLICATIONS

Zavesky et al., "Modification of Content Based on User Interaction Sequences," U.S. Appl. No. 17/342,413, filed Jun. 8, 2021.
(Continued)

*Primary Examiner* — Mahran Y Abu Roumi

(57) ABSTRACT

A processing system may identify a plurality of user interaction data associated with a target category of a plurality of users, identify a relevant subset of user interaction data, compress the plurality of user interaction data to the relevant subset of user interaction data, train a machine learning model with the relevant subset of user interaction data, obtain additional user interaction data associated with an additional user, identify a relevant subset of the additional user interaction data, apply the relevant subset of the additional user interaction data as an input to the machine learning model, obtain an output of the machine learning model quantifying a measure of which the relevant subset of the additional user interaction data is indicative of the target category, and perform at least one action responsive to the measure of which the relevant subset of the additional user interaction data is indicative of the target category.

20 Claims, 3 Drawing Sheets

(51) Int. Cl.
*G06N 3/08* (2023.01)
*H04L 67/1396* (2022.01)

(58) Field of Classification Search
CPC ..... H04L 41/16; H04L 41/14; H04L 41/5054; H04L 41/0894; H04L 41/0893
See application file for complete search history.

(56) References Cited

U.S. PATENT DOCUMENTS

| | | | |
|---|---|---|---|
| 2015/0127783 A1* | 5/2015 | Lissack | H04L 41/5054 709/220 |
| 2017/0359368 A1* | 12/2017 | Hodgman | H04L 63/1441 |
| 2020/0327395 A1* | 10/2020 | Simard | G06V 10/764 |
| 2021/0117718 A1* | 4/2021 | Badjatiya | G06F 18/214 |
| 2021/0295177 A1* | 9/2021 | Joshi | G06N 5/04 |

OTHER PUBLICATIONS

Seyed Amir Mir Bagheri et al., "Compression of Uniform Resource Locator Sequences for Machine Learning-Based Detection of Target Category Examples," U.S. Appl. No. 17/203,099, filed Mar. 16, 2021.

* cited by examiner

COMPRESSION OF USER INTERACTION DATA FOR MACHINE LEARNING-BASED DETECTION OF TARGET CATEGORY EXAMPLES

The present disclosure relates generally to machine learning model deployment, and more particularly to methods, non-transitory computer-readable media, and apparatuses for compressing user interaction data indicative of a target category.

BACKGROUND

Machine learning in computer science is the scientific study and process of creating algorithms based on data that perform a task without any instructions. These algorithms are called models and different types of models can be created based on the type of data that the model takes as input and also based on the type of task (e.g., prediction, classification, or clustering) that the model is trying to accomplish. The general approach to machine learning involves using the training data to create the model, testing the model using the cross-validation and testing data, and then deploying the model to production to be used by real-world applications.

SUMMARY

In one example, the present disclosure describes a method, computer-readable medium, and apparatus for compressing user interaction data indicative of a target category. For instance, a processing system including at least one processor may identify a plurality of user interaction data associated with a target category of a plurality of users of a communication network, identify a relevant subset of user interaction data from the plurality of user interaction data, compress the plurality of user interaction data to the relevant subset of user interaction data, train a machine learning model with the relevant subset of user interaction data that are indicative of the target category, obtain additional user interaction data associated with an additional user, identify a relevant subset of the additional user interaction data, apply the relevant subset of the additional user interaction data as an input to the machine learning model that has been trained, obtain an output of the machine learning model quantifying a measure of which the relevant subset of the additional user interaction data is indicative of the target category, and perform at least one action in the communication network responsive to the measure of which the relevant subset of the additional user interaction data is indicative of the target category.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
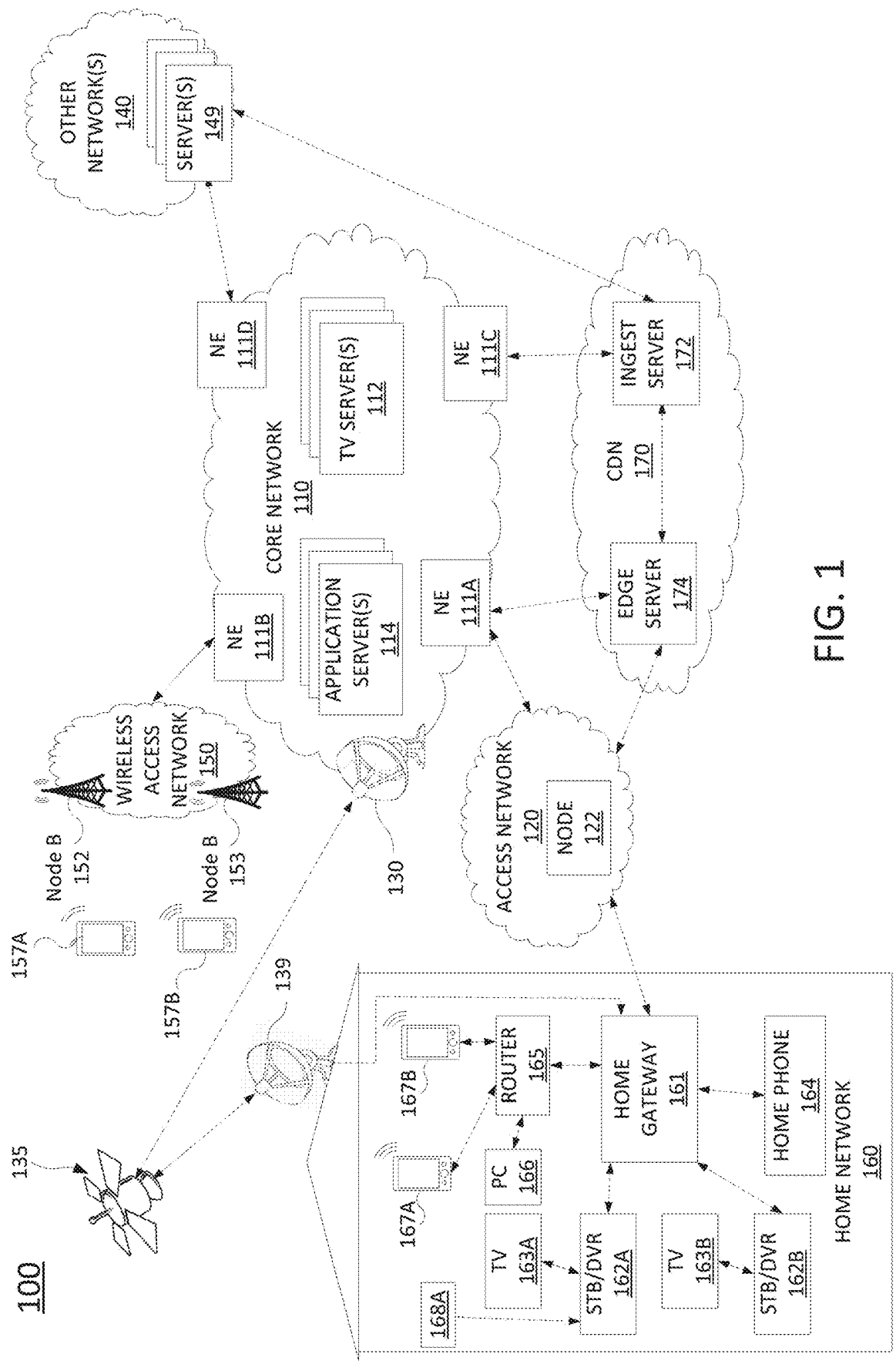
FIG. 1 illustrates an example network related to the present disclosure.

Examples of the present disclosure describe methods, computer-readable media, and apparatuses for compressing user interaction data indicative of a target category. With billions of connected systems on the internet, users and consumers of communication network-based services regularly interact with service providers via access to uniform resource locators (URLs) (broadly "webpages") via browsers or other applications, telephone calls, or in-store interactions. Millions of user interaction data points can be stored and used for machine learning to detect or predict a particular customer behavior or outcome.

The amount of storage consumed by the user interaction data points can be expensive. For example, thousands of servers may be needed to store the data. Expensive real estate can be consumed to locate the thousands of application servers that can store the data.

In addition, processing the millions of user interaction data points can be taxing on processing resources to train a machine learning model. The more data that is used to train the machine learning model, the more processing resources that are consumed.

The present disclosure compresses the user interaction data into a relevant subset of user interaction data. As a result, the amount of data that is stored and processed may be reduced. This may reduce costs (e.g., less servers to store the data, less real estate to store the servers, less processing resources consumed, less power consumed, and the like).

In one example, the user interactions may include different categories of user interaction data. For example, the categories may include uniform resource locators (URLs) interaction data, call record data, and in-store interaction data tracked and stored on a server. Each category of user interaction data may be compressed and then combined to train the machine learning model for a particular target category. Subsequent relevant user interaction data for an additional user may then be fed to the trained machine learning model to calculate an output (e.g., a probability that the user interaction data is included in the particular target category). An action may be taken in response to the output generated by the machine learning model.

With respect to URL, users may have similar actions that they take as a result of accessing webpages from site to site. These similar actions that lead to certain propensities that can be utilized to compress, not only the storage of sequences of URLs that may be accessed by a user, but also compress the network traffic using behavior typing of similar combinations within historical URL sets. Additionally, this ensures that relevant URLs to a current topic interest are stored, while other URLs may be discarded, and therefore data access is restricted to desired groups for privacy and security.

With respect to call records, users may have similar actions that they take as a result of certain actions taken during a call to a service provider. For example, a certain sequence of automated menu selections may be repeatedly made for customers, e.g., to terminate a service contract, to remove a service feature, to add a service feature, to add a new line, to drop a line, and so on.

With respect to in-store interaction logs, users may have similar actions that they take as a result of certain actions taken during in-store visits. For example, users who may intend to terminate a service contract may inquire with store personnel as to the remaining time period left on the service contract, users who may want a new phone may check in frequently with store personnel for any current promotional deals, users who may have problems with their endpoint devices may visit in-store technical assistance personnel to repair a device, and the like.

In some examples, certain combinations of the user interactions may result in certain future actions to likely be taken in the future. For example, user interactions to certain URLs while using the WiFi access during an in-store interaction may indicate that the user is about to terminate a service contract. For example, a user may compare prices for a device at a number of different competitor URLs while visiting a service provider store.

In one embodiment, the user interaction data may be stored on separate devices, compressed separately, and then stored in a relevant user interaction database. For example, the URL user interaction data may be stored on a user device and the user interaction data may be accessed from the device. The call record user interaction data may be stored in a call center log database and the user interaction data may be accessed from the call center log database. The in-store user interaction data may be stored in a server in the store that stores the user interactions and the user interaction data may be accessed from the server. Each category of user interaction data may be separately compressed and then combined and stored in the relevant user interaction database. The machine learning model may then be fed the relevant user interaction data from the relevant user interaction database to train the machine learning model.

Thus, the present disclosure ensures that user interactions relevant to the problem at hand are stored, while others are discarded, and therefore the data access is restricted to appropriate groups (e.g., groups of users who provided their consent for their interaction data to be used) for privacy and security. Notably, previously unknown sources may be uncovered to enhance the relevant behavior database. In addition, user interaction data are compressed to realize savings in both data storage as well as the computation and communication of these patterns across the network.

The compressed user interaction data can then be used to train a machine learning model more efficiently. The trained machine learning model may receive subsequently compressed user interaction data of an additional user to generate an output. Based on the output, at least one action may be taken. The at least one action may include a change to a network element to redirect a requested URL, change a configuration of a network element to re-direct traffic, and the like. Furthermore, examples of the present disclosure may implement network load balance based on knowledge of a number of users in a target category, their locations, device types, network utilization at different times-of-day, days of the week, etc. Similarly automatic software defined network (SDN) network resource instantiation and/or allocation may be adapted based on this information learned in accordance with the present disclosure. These and other aspects of the present disclosure are described in greater detail below in connection with the examples of FIGS. 1-3.

To better understand the present disclosure, FIG. 1 illustrates an example network 100, related to the present examples. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device (or "user endpoint device") configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a fiber access network, a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. In one embodiment, the application servers 114 may include memory or a database to store call records associated with telephone calls and/or interaction with the IVR systems.

The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. It should be noted that the foregoing are only several examples of the types of relevant application servers 114 that may be included in core network 110 for storing information relevant to providing various services to users.

Figure 2:
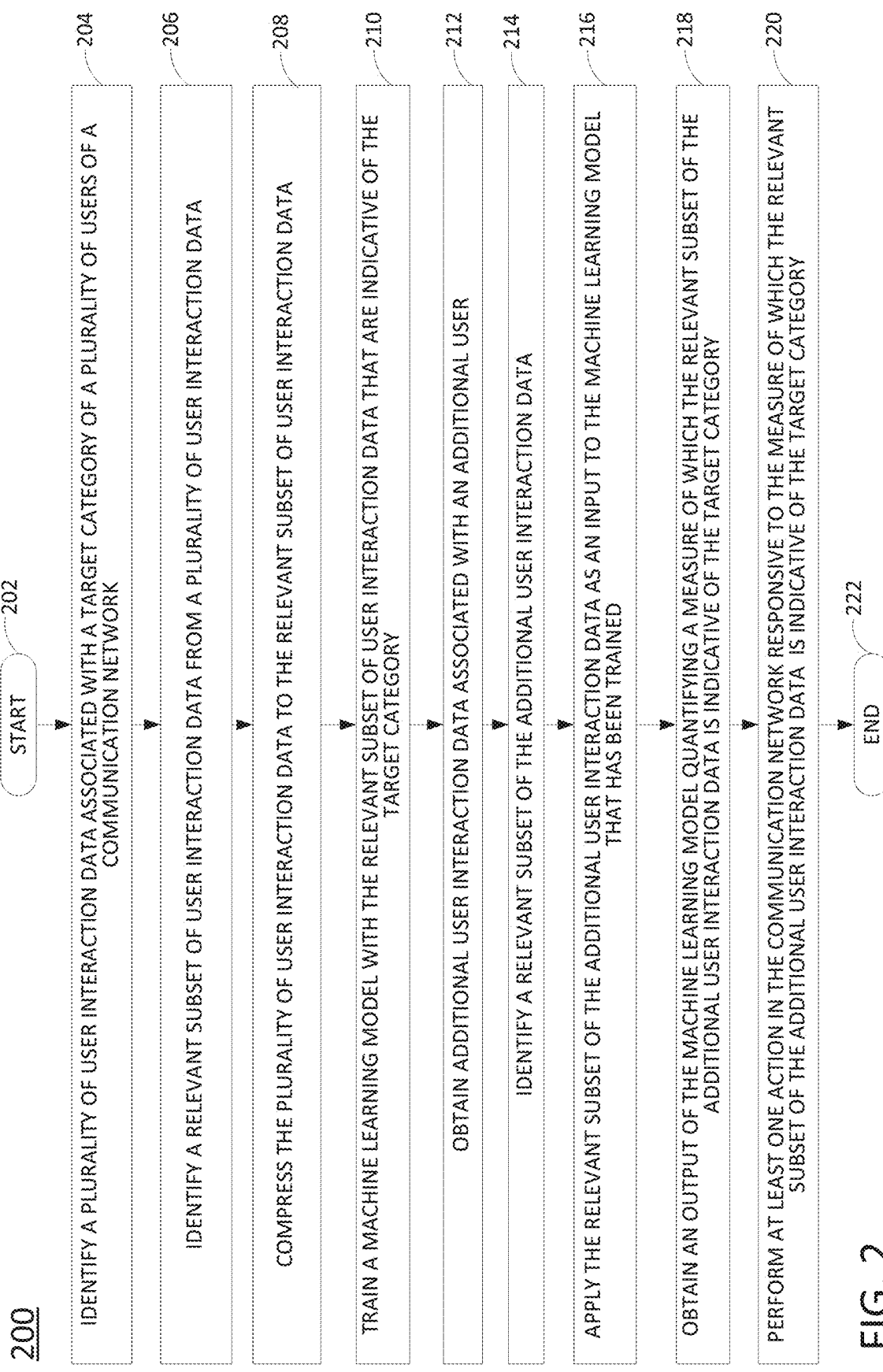
FIG. 2 illustrates a flowchart of an example method for compressing user interaction data indicative of a target category.

Application servers 114 may also represent a processing system for compressing user interaction data indicative of a target category. For instance, one or more of application servers 114 may each comprise a computing device or processing system, such as computing system 300 depicted in FIG. 3, and may be configured to perform one or more steps, functions, or operations for compressing user interaction data indicative of a target category. For instance, an example method for compressing user interaction data indicative of a target category is illustrated in FIG. 2 and described below.

Figure 3:
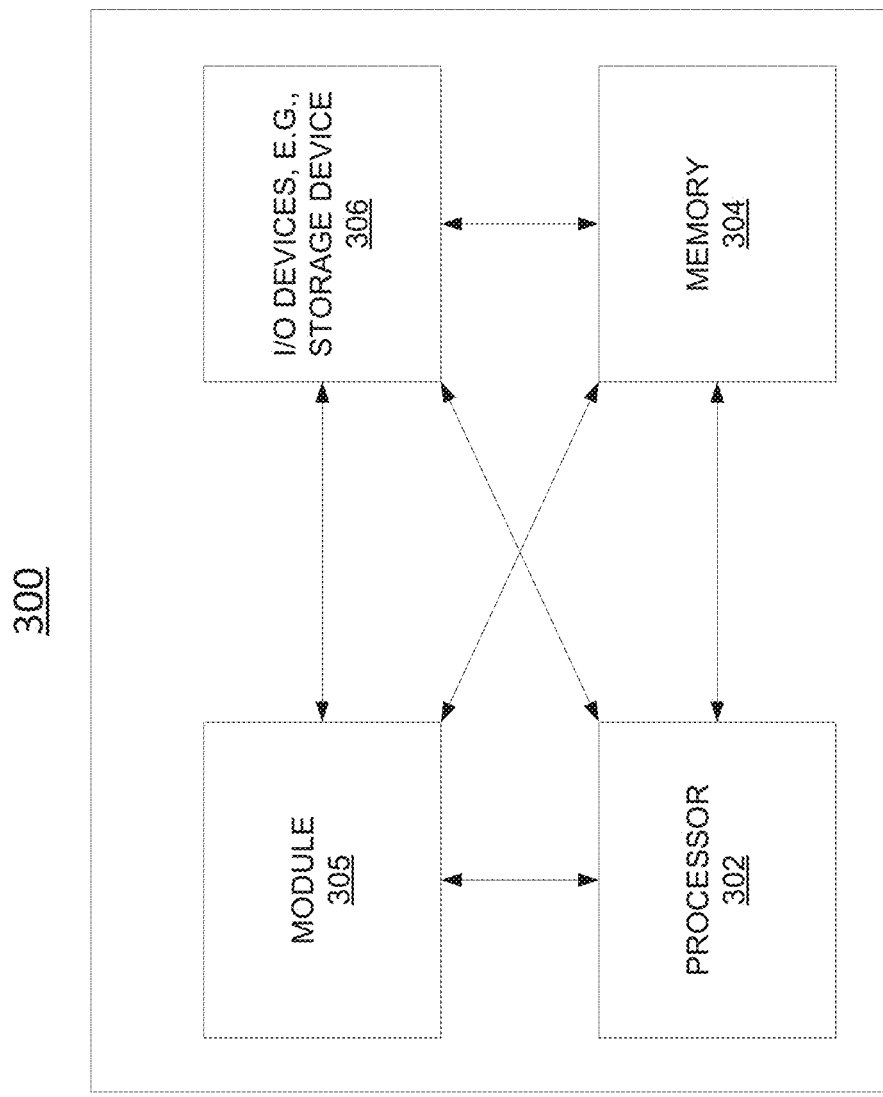
FIG. 3 illustrates a high level block diagram of a computing device or system specifically programmed to perform the steps, functions, blocks and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 3 and discussed below) or multiple computing devices collectively configured to perform various steps, functions, and/or operations in accordance with the present disclosure.

In accordance with the present disclosure, other networks 140 and servers 149 may comprise networks and devices of various content providers of webpages, documents, videos, or other content items. In one example, servers 149 may represent "origin servers" which may originate content that may be stored in and distributed via content distribution network (CDN) 170. In this regard, the content from servers 149 that may be stored in and distributed via content distribution network (CDN) 170 may include webpages, documents, audio programs, video programs, e.g., movies, television shows, video news programs, sports video content, and so forth, as well as video advertisements.

In one embodiment, the other networks 140 and servers 149 may also include local networks of retail establishments and local servers that collect in-store interaction data. For example, the other network may be a WiFi network of a retail establishment. The server 149 may collect user interaction data of an endpoint device of a user that is connected to the WiFi network at the retail establishment. The server 149 may also collect in-store user interaction data recorded by an employee that records the details of a user interaction (e.g., customer information, details of a product or service a customer was looking for, and the like).

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions comprise a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

Network 100 may also include a content distribution network (CDN) 170. In one example, CDN 170 may be operated by a different entity from the core network 110. In another example, CDN 170 may be operated by a same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end users, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth.

As mentioned above, TV servers 112 in core network 110 may also include one or more interactive TV/video-on-demand (VoD) servers and/or network-based DVR servers. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client video player. For example, STB/DVR 162A may present a user interface and receive one or more inputs (e.g., via remote control 168A) for a selection of a video. STB/DVR 162A may request the video from an interactive TV/VoD server and/or network-based DVR server, which may retrieve a manifest file for the video from one or more of application servers 114 and provide the manifest file to STB/DVR 162A. STB/DVR 162A may then obtain one or more portions of the video from one or more network-based servers, such as one of the TV servers 112, edge server 174 in CDN 170, and so forth, as directed via the manifest file. For instance, URL(s) and other information that may be used by a player device to request and obtain chunks of adaptive or non-adaptive bitrate video may be stored in the manifest file which may be obtained by the player device in advance of a streaming session.

To illustrate, the manifest file may direct the STB/DVR 162A to obtain the video from edge server 174 in CDN 170. The edge server 174 may already store the video (or at least a portion thereof) and may deliver the video upon a request from the STB/DVR 162A. However, if the edge server 174 does not already store the video, upon request from the STB/DVR 162A, the edge server 174 may in turn request the video from an origin server. The origin server which stores the video may comprise, for example, one of the servers 149 or one of the TV servers 112. The video may be obtained from an origin server via ingest server 172 before passing the video to the edge server 174. In one example, the ingest server 172 may also pass the video to other middle tier servers and/or other edge servers (not shown) of CDN 170. The edge server 174 may then deliver the video to the STB/DVR 162A and may store the video until the video is removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 167A, 167B, 157A or 157B obtaining a manifest file for a video from one of the TV servers 112, from one of the servers 149, etc., and requesting and obtaining videos (e.g., the video chunks thereof) from edge server 174 of CDN 170 in accordance with corresponding URLs in the manifest file.

As mentioned above, one or more of the application servers 114 may represent a processing system for compressing user interaction data indicative of a target category. The user interaction data may include different categories of user interaction data, such as URL data, call records, and in-store interactions. To illustrate, application server(s) 114 may collect URLs visited, browsed, accessed, or otherwise selected by various endpoint devices, such as mobile devices 157A, 157B, 167A, and 167B, and/or PC 166. For instance, selected URLs may be accessed via web browsers or other applications ("apps") of such devices, including social networking applications, map applications, gaming applications, productivity applications, calendar and scheduling applications, and so forth. In one example, application server(s) 114 may collect URLs associated with usage of STBs/DVRs 162A and 162B, TV 163A, and/or TV 163B (e.g., URLs related to video and/or video chunk selections, URLs related to accessing of programming information via a television programming guide or the like, URLs accessed via browsers of TVs 163A and 163B (e.g., smart TVs), etc.). The URLs may be associated with communication sessions between such endpoint devices and various network-based devices, devices reachable via access network 120, wireless access network 150, core network 110, CDN 170, other networks 140, etc., such as servers 149, edge server 174, and TV servers 112.

In one example, the collections of URLs (e.g., URL histories) may be obtained from the endpoint devices directly. For instance, the endpoint devices may be configured, with permission/consent of the users and/or the device owners, to collect and report on a URL history for each respective device. Alternatively, or in addition, URL histories of various endpoint devices and/or the users thereof may be obtained from one or more network-based devices or processing systems, such as network elements 111A-111D, edge server 174, TV servers 112, and/or any other such device(s) that may be within a communication path. For instance, such network-based devices may generate a record of a communication by source or destination IP address, along with the URL and a timestamp.

In one example, the call records may be collected by the application servers 114. The call records may include voice recordings with a customer service agent, menu selections made when interacting with an IVR system, and the like. The voice recordings may be analyzed using natural language processing (NLP) to extract key words that can be associated with an outcome of the call record. For example, a customer may call for technical assistance with a home WiFi network. The NLP may extract keywords, such as the model number of the router, the problem with the WiFi network, actions that may have been performed (e.g., reset, power cycle, configuration changes, and the like). The outcome may have been a successful reconnection of the home WiFi network. Thus, the call record may store the keywords associated with an outcome of a successful or unsuccessful customer interaction.

In one example, the in-store interactions may be collected and stored by a server 149 at a retail establishment. For example, URL interaction data of a mobile endpoint device of a user that is accessed when connected to a local WiFi network of the retail establishment.

In addition to collecting user interaction data, application server(s) 114 may also store information regarding various users being associated with various target categories, such as users associated with fraudulent use of the communication network, users associated with a utilization of a network resource of the communication network, users associated with an accessing of a particular data content or a type of data content via the communication network, users associated with a change in endpoint devices or network access equipment, etc. In one example, application server(s) 114 may then identify, for a particular target category, the user interaction data that are most associated with the target category. For instance, the target category may be user churn and the application server(s) 114 may measure user interaction data of known churners, and then compare to measurements of user interaction data of known non-churners. User churn, or "churners," may be users that are willing to break a service contract to sign up for services with a different, or competitor, service provider. Application server(s) 114 may then determine a ratio of the user interaction data of churners to non-churners, and score/rank the user interaction data based on this ratio.

In one example, the ratios may be modified to account for standard deviation, errors, etc. After determining scores for all the user interaction data, application server(s) 114 may then rank/order the user interaction data by score, and may select to keep a top "N" number of user interaction data by score/rank, user interaction data that exceed a threshold score, a top "N" percent of the user interaction data, etc. In various examples, the number or percent of the user interaction data to keep and/or the threshold score may be selected based upon different considerations, such as a desired number of the user interaction data to keep, a maximum desired storage volume to store compressed user interaction data, a prediction accuracy of the machine learning model, and so forth.

In any case, after selecting the top user interaction data relating to a particular target category, application server(s) 114 may then compress user interaction data to exclude user interaction data failing the threshold/cutoff (e.g., keeping those URLs deemed most important/relevant by score/rank). As referred to herein, these compressed user interaction data may be referred to as a "subset of user interaction data" or "compressed user interaction data." Notably, a prediction model, e.g., a machine learning model, for detecting additional examples of the target category may then be trained by application server(s) 114 with the compressed user interaction data, e.g., using the compressed user interaction data of known members of the target category as positive training examples.

In one example, compressed user interaction data of known non-members of the target category may also be used as additional training data for the machine learning model (e.g., negative training examples). Notably, deep learning algorithms may experience a vanishing gradient problem. For instance, when feeding sequential data to such learning algorithms, there may be a diminishing value of older inputs such that anything older than X, e.g., older than 500 examples, becomes useless. Moreover, for a large percentage of users, user interaction data may easily accumulate many user interaction data within 10 minutes to an hour. However, using the present approach, multiple days of data may be used because relevant user interaction data are retained and others are discarded.

In one example, the machine learning model may comprise a recurrent neural network (RNN). However, in other examples, the machine learning model may take a different form. In this regard, it should be noted that as referred to herein, a machine learning model (MLM) (or machine learning-based model) may comprise a machine learning algorithm (MLA) that has been "trained" or configured in accordance with input data (e.g., training data) to perform a particular service, e.g., to detect fraud and/or to provide a fraud indicator, or value indicative of a likelihood of fraud. Thus, in other examples, the present disclosure may incorporate various types of MLAs/models that utilize training data, such as a support vector machine (SVM), e.g., a linear or non-linear binary classifier, a multi-class classifier, a deep learning algorithm/model, such as another type of deep learning neural network or deep neural network (DNN), a generative adversarial network (GAN), a decision tree algorithms/models, such as gradient boosted decision tree (GBDT), a k-nearest neighbor (KNN) clustering algorithm/model, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth.

With the benefit of such a trained machine learning model, application server(s) 114 may continue to obtain user interaction data, compress the user interaction data to retain the user interaction data determined to be relevant/important per the example ranking methodology discussed above, feed these compressed user interaction data to the trained machine learning model as inputs, and obtain predictive scores from the machine learning model as outputs indicative of how likely/not likely the compressed user interaction data is indicative of the target category (e.g., how similar/dissimilar is the compressed user interaction data to the user interaction data of known members of the target category?). In other words, the output of the machine learning model is a score/prediction indicative of the likelihood that the user associated with the compressed user interaction data is also a member of the target category or will be a member of the target category.

In addition to the foregoing, application server(s) 114 may also perform at least one action in the network 100 responsive to output(s) of the machine learning model, e.g., the measure(s) of which the compressed user interaction data is/are indicative of the target category. For instance, application server(s) 114 may learn the numbers and/or percentages of users, their locations (and/or locations of the respective endpoint devices), and the utilization trends of such users, and may then perform the at least one action in response. For instance, application server(s) 114 may provide, to at least one recipient computing system, a measure of which user interaction data is indicative of the target category, an aggregate metric based upon the measure(s) of which number of user interaction data are indicative of the target category, and so forth. The application server(s) 114 may provide such information in the form of a notification or a report, a table, a spreadsheet, or a chart, a map, which may indicate a geographic distribution of users (or endpoint devices) who are (and/or are not) part of a target category, and so on. The at least one recipient computing system may comprise an endpoint device of a network operations personnel, or may comprise one or more additional automated computing systems.

In one example, application server(s) 114 may also represent a self-optimizing network (SON)/software defined network (SDN) controller that may function as a self-optimizing network (SON) orchestrator that is responsible for activating and deactivating, allocating and deallocating, and otherwise managing a variety of network components. For instance, application server(s) 114 may activate and deactivate antennas/remote radio heads of wireless access network 150, may steer antennas/remote radio heads of wireless access network 150 (e.g., adjusting vertical tilt angles, azimuth bearings, beamwidths, power levels, and or other settings), may allocate or deallocate (or activate or deactivate) baseband units in a BBU pool, may add (or remove) one or more network slices, may instantiate or de-instantiate one or more virtual network functions, and may perform other operations for adjusting configurations of components of wireless access network 150 in accordance with the present disclosure.

In one example, application server(s) 114 may represent an SDN controller that is responsible for instantiating, configuring, managing, and releasing VNFs to perform the functions of routers, switches, and other devices, provisioning routing tables and other operating parameters for the VNFs, and so forth. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes. Accordingly, application server(s) 114 representing an SDN controller may be connected directly or indirectly to any one or more network elements of core network 110, and of the network 100 in general.

Thus, in one example, at least one action in the network responsive to output(s) of the machine learning model may comprise application server(s) 114 allocating at least one additional resource of the communication network or removing at least one existing resource of the communication network, such as providing an additional content server or removing an existing content server, adding an additional network firewall or removing an existing network firewall, and so on. In one example, the at least one action in the network may alternatively or additionally comprise re-routing at least a portion of traffic in a selected portion of the network. For instance, if a new firewall is added or an existing firewall is removed, application server(s) 114 may update routing tables or other traffic flow mechanisms to send network traffic to such a new firewall, or to redirect network traffic from a firewall that is being deactivated/removed to a different firewall, and so on.

Similarly, in one example, the at least one action in the network may comprise load-balancing at least a portion of network traffic in the selected portion of the communication network. For instance, the output(s) of the machine learning model may be indicative of a demand prediction for a particular content or type of content at a particular time of day, day of the week, etc. from users in various locations. Thus, application server(s) 114 may be tasked with distributing user requests for such a content item to different content servers based upon the anticipated demand. For instance, some users (e.g., their respective endpoint devices) may be equally served by two content servers, whereas endpoint devices of other users may be in locations or have equipment that otherwise can only be served by one of the content servers. Accordingly, application server(s) may reserve capacity of one of the content servers for those users who cannot be directed elsewhere, while directing other users/endpoint devices to the alternate content server.

In one example, the at least one action in the network may include offloading at least a portion of traffic in a selected portion of the network, e.g., based upon anticipated/predicted demand, application server(s) 114 may offload a portion of traffic in the selected portion of the network before it is overloaded. In still another example, the at least one action in the network may include applying a denial-of-service mitigation measure in the selected portion of the network, e.g., blocking, slowing, or redirecting selected flows or connections, etc. For instance, the target category may be a fraudulent use of the network, and the outputs of the machine learning model may indicate a large number of users/endpoint devices are or will be engaged in a botnet, or the like. For example, these endpoint devices may have user interaction data indicative of connecting to command and control servers to obtain instructions for a denial of service attack, indicative of attempted connections to a domain being attacked, etc.

Further details regarding the functions that may be implemented by application servers 114, mobile devices 157A, 157B, 167A, and 167B, PC 166, TV servers 112, servers 149, edge server 174, ingest server 172, STBs/DVRs 162A and 162B, TV 163A, and/or TV 163B, are discussed in greater detail below in connection with the example of FIG. 2. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 2 illustrates a flowchart of a method 200 for compressing user interaction data indicative of a target category, in accordance with the present disclosure. In one example, the method 200 is performed by one or more of application server(s) 114 of FIG. 1, or any one or more components thereof, such as a processing system, or by one of these devices in conjunction with other devices and/or components of network 100 of FIG. 1. In one example, the steps, functions, or operations of method 200 may be performed by a computing device or system 300, and/or a processing system 302 as described in connection with FIG. 3 below. For instance, the computing device or system 300 may represent any one or more components of the network 100 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system, and each instance may represent one of application servers 114, edge server 174, ingest server 172, TV servers 112, and so forth in FIG. 1. For illustrative purposes, the method 200 is described in greater detail below in connection with an example performed by a processing system, such as processing system 302. The method 200 begins in step 202 and proceeds to step 204.

At step 204, the processing system identifies a plurality of user interaction data associated with a target category of a plurality of users of a communication network. For example, the user interaction data may include different categories of user interaction data. The user interaction data may include URL data collected from endpoint devices of users or an application server in a communication network connected to the endpoint devices, call records from voice call interactions with a customer service representative or an IVR system, in-store user interactions, and the like.

In an example, the target categories may include fraud, user churn, utilization of a network resource of the communication network, accessing a particular data content or type of data content via the communication network, a network event, e.g., an overload network event, a congestion network event, a network component failure or degradation event, a network denial of service event, a drop call event, a network denial of access event, and the like. In other words, the user interaction data may be used to indicate whether a user is a member of a group of users associated with one of the target categories.

In one example, step 204 may further include removing defined sensitive user interaction data from the plurality of user interaction data associated with the target category. In various examples, the target category may comprise users associated with a utilization of a network resource of the communication network, users associated with an accessing of a particular data content or a type of data content via the communication network, users associated with fraudulent use of the communication network, users associated with a change in network access equipment (e.g., users changing mobile endpoint devices, set-top boxes, gateways, routers, and so on).

At step 206, the processing system identifies a relevant subset of the user interaction data from the plurality of user interaction data. In one embodiment, the relevant subset of user interaction data may be determined by applying a Bayes' theorem to the user interaction data. The Bayes' theorem may calculate a probability that a particular user interaction data belongs in a member group for the target category. For example, the target category may be a network component failure event, and the user interaction data may be analyzed to determine whether a user is within a part of the affected population that was impacted by the network component failure event or within a non-affected population. Alternatively, the target category may be user churn and the user interaction data may be analyzed to determine whether a user is within a churner population or a non-churner population. To illustrate in an example, the Bayes' theorem may be defined as follows:

$$p(c|t)=p(t|c)p(c)/p(t),$$ Equation (1):

where t represents a token, c represents churn (e.g., true or false). The score of the tokens, may be calculated as $p(c=1|t)/p(c=0|t)\alpha\ p(t|c=1)/p(t|c=0)$. User interaction data with tokens that are within a group of the top N number of scores, or scores above a threshold, may be selected as being relevant user interaction data and be selected as part of the relevant subset of user interaction data.

User interaction data with tokens that have a high score above a threshold may be selected as being part of relevant user interaction data and be selected as part of the relevant subset of user interaction data. In one example, a high score may be selected as a top N number scores. In another example, a high score may be selected as a top percentage of scores.

In one embodiment, the threshold may be a predefined number of user data interactions to include in the relevant subset of user interaction data. For example, the threshold may be set based upon a defined average number of user interaction data to be retained to train a machine learning model or to be processed by a trained machine learning model, as discussed in further details below. In one embodiment, the threshold may be set based upon a defined maximum number of user interaction data for a target category.

In one embodiment, each category of user interaction data may be processed to identify the relevant subset of user interaction data for each category. For example, the relevant subset of user interaction data for URL data may be identified, the relevant subset of user interaction data for call records may be identified, and the relevant subset of user interaction data for in-store interactions may be identified. Each category of user interaction data may have a different threshold or top N number of scores to identify the relevant subset of user interaction data for a category. For example, there may be more URL data than call records and/or in-store interactions. Thus, the URL user interaction data may include the top 2000 user interaction data based on the scoring using the Bayes' theorem described above. The call record data and the in-store interaction data may use the top 500 user interaction data, as an example.

At step 208, the processing system compresses the plurality of user interaction data to the relevant subset of user interaction data. In other words, the irrelevant user interaction data (e.g., user interaction data with tokens that have a score below the threshold) may be removed or deleted. In one embodiment, if the relevant subset of user interaction data is identified separately for each category of user interaction data, the relevant subset of the user interaction data for each category may be combined to form an architype of user interaction data in the compression of the relevant subset of user interaction data. In one alternative embodiment, compression may also encompass removing a portion of each user interaction instance or record of the relevant subset of user interaction data, e.g., removing personal identifying data of the users to maintain privacy, removing irrelevant portions of each user interaction instance or record, e.g., removing a user's news website browsing when the pertinent target category is churning or removing a user's remote network communications when the pertinent target category is a local network failure event, and so on. Thus in one embodiment, not only is the number of records compressed, but the content of each record can also be compressed. For example, if each user interaction record contains 20 fields of information, the relevant user interaction record can be compressed down to 3 fields that are pertinent to a particular target category. For example only, if the target category is "dropped call," then the pertinent fields may encompass 1) location of the mobile device, 2) the signal strength of the call session, 3) the time stamp of the dropped call, and 4) the access node servicing the mobile device when the call was dropped, whereas all other fields of the call session can be omitted when this user interaction record is compressed.

At step 210, the processing system trains a machine learning model with the relevant subset of user interaction data that are indicative of the target category. For instance, the machine learning model may be trained, based upon the relevant subset of user interaction data, to detect additional user interaction data that are indicative of the target category (e.g., additional user interaction data that are similar to the plurality of user interaction data that were used for the training). In one example, the machine learning model comprises a recurrent neural network. In one example, relevant subset of user interaction data may then be fed to the trained machine learning model as inputs, and the machine learning model may generate outputs, e.g., values or scores, indicative of how likely/not likely each relevant subset of user interaction data is indicative of the target category (e.g., how similar/dissimilar is the relevant subset of user interaction data to the relevant subset of user interaction data of known members of the target category?). In other words, the output of the machine learning model is a score/prediction indicative of the likelihood that the user associated with the relevant subset of user interaction data is also a member of the target category or will be a member of the target category.

At step 212, the processing system obtains additional user interaction data associated with an additional user, e.g., URL data, call records, and/or in-store interactions of a user with an unknown status with regard to belonging/not belonging to the target category.

At step 214, the processing system identifies a relevant subset of the additional user interaction data. For instance, step 214 may comprise similar operations as in step 206, such as extracting relevant user interaction data, from among the plurality of additional user interaction data by applying a Bayes' theorem, as described above.

At step 216, the processing system applies the relevant subset of the additional user interaction data as an input to the machine learning model that has been trained.

At step 218, the processing system obtains an output of the machine learning model quantifying a measure of which the relevant subset of the additional user interaction data is indicative of the target category.

At step 220, the processing system performs at least one action in the communication network responsive to the measure of which the relevant subset of the additional user interaction data is indicative of the target category. For instances, the at least one action may include re-directing a URL request of the additional user to a different URL based on the output of the machine learning model. For example, the user may be identified as a churner by the machine learning model (e.g., the machine learning model may output a probability that the user will likely be a churner in the future). In other words, the user may likely terminate a service contract to subscribe services with another service provider. For example, the user may request URLs for a plurality of competing service provider websites during a holiday season or a promotion season. However, the URL request may be first redirected to a URL for a promotional offer from the current service provider. The redirected URL may have an option to accept the redirected URL to see the current promotional offer from the current service provider or to simply continue to the originally requested URL website of another service provider.

In another example, the at least one action may be to configure a network element to restrict access of the additional user based on the output of the machine learning model. For example, the target category may be fraud. The additional user may be identified as likely to be a fraudulent user or hacker based on the output from the machine learning model. In response, a network element (e.g., a router, a firewall, and the like) may be reconfigured to restrict access of the additional user to certain URLs or to certain servers in the network.

In other examples, the at least one action may comprise at least one of: re-routing at least a portion of network traffic in a selected portion of the communication network, load-balancing at least a portion of network traffic in the selected portion of the communication network, offloading at least a portion of network traffic in the selected portion of the communication network, applying a denial-of-service mitigation measure in the selected portion of the communication network, or the like. In one example, step 220 may alternatively or additionally comprise at least one of: allocating at least one additional resource of the communication network responsive to the measure of which the subset of relevant user interaction data is indicative of the target category or removing at least one existing resource of the communication network responsive to the measure of which the subset of relevant user interaction data is indicative of the target category.

In accordance with step 220, an additional resource that may be added or an existing resource that may be removed (e.g., deactivated and/or deallocated) may be a hardware component of the network, or may be provided by hardware, e.g., bandwidth on a link, line card, router, switch, or other processing nodes, a CDN storage resource, a VM and/or a VNF, etc. Similarly, the additional resource may be a caching of a primary content, or a secondary content that is similar or related to the primary content associated with the target category that is predicted to be in demand at one or more future time periods and in one or more geographic locations and/or network regions.

In still another example, step 220 may alternatively or additionally include providing, to at least one recipient computing system, at least one of: the measure of which the relevant user interaction data is indicative of the target category, or an aggregate metric based upon (1) the measure of which the relevant user interaction data is indicative of the target category and (2) a plurality of additional measures of which other relevant user interaction data are determined, via the machine learning model, to be indicative of the target category. As noted above, the metric and/or the aggregate metric may be presented in the form of a notification or a report, a table, a spreadsheet, or a chart, a map, which may indicate a geographic distribution of users (or endpoint devices) who are (and/or are not) part of a target category, and so on.

Following step 220, in one example, the method 200 may return to step 206, wherein step 206 and subsequent steps of the method 200 may be repeated to identify new training examples, to retrain the machine learning model, and so forth. In one example, following step 220, the method 200 may return to step 212 for one or more additional iterations/cycles, wherein step 212 and subsequent steps of the method 200 may be repeated to obtain additional user interaction data of additional users, to identify and compress relevant subsets of the additional user interaction data, to apply the compressed relevant subsets of user interaction data to the machine learning model, to obtain output measures, and to perform one or more actions in the communication network responsive to the measure(s) of which the relevant user interaction data is/are indicative of the target category. Otherwise, following step 220, the method 200 may proceed to step 222 where the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 206-208, or steps 214-218, as noted above. In one example, step 206 may include removing sensitive user interaction data, e.g., if not excluded from the user interaction data associated with the target category that are identified at step 204. In one example, the method 200 may further include selecting or setting the threshold applied at step 206 for inclusion of user interaction data in the subset of user interaction data associated with the target category, e.g., based upon a desired maximum storage volume for storing compressed user interaction data, based upon a desired minimum accuracy of the machine learning model's predictions, etc. In this regard, in one example, the method 200 may also include monitoring accuracy of predictions and updating/retraining the machine learning model with additional examples after the status of an unknown user with respect to the target category becomes known. Similarly, additional examples of users known to be of the target category may be used to re-evaluate the user interaction data associated with the target category. For instance, the user interaction data most associated with the target category, e.g., as determined per the operations of step 206, may change over time as users' behaviors and preferences change. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure. The method 200 may also be expanded to include additional steps. Thus, these and other modifications are all contemplated within the scope of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the system 300. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for compressing user interaction data indicative of a target category, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for compressing user interaction data indicative of a target category (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for compressing user interaction data indicative of a target category (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    identifying, by a processing system including at least one processor, a plurality of user interaction data associated with a target category of a plurality of users of a communication network;
    identifying, by the processing system, a relevant subset of user interaction data from the plurality of user interaction data, wherein the identifying the relevant subset of user interaction data comprises:
        generating, by the processing system, a token score for each user interaction data in the plurality of user interaction data; and
        selecting, by the processing system, a top N number of user interaction data from the plurality of user interaction data that has a respective token score above a threshold;
    compressing, by the processing system, the plurality of user interaction data to the relevant subset of user interaction data, wherein the compressing comprises:
        removing user interaction data having a respective token score below the threshold and removing a portion of data from at least one user interaction data from the relevant subset of user interaction data;
    training, by the processing system, a machine learning model with the relevant subset of user interaction data that are indicative of the target category;
    obtaining, by the processing system, additional user interaction data associated with an additional user;
    identifying, by the processing system, a relevant subset of the additional user interaction data;
    applying, by the processing system, the relevant subset of the additional user interaction data as an input to the machine learning model that has been trained;
    obtaining, by the processing system, an output of the machine learning model quantifying a measure of which the relevant subset of the additional user interaction data is indicative of the target category; and
    performing, by the processing system, at least one action in the communication network responsive to the measure of which the relevant subset of the additional user interaction data is indicative of the target category.

2. The method of claim 1, wherein the at least one action comprises re-routing at least a portion of traffic in a selected portion of the communication network.

3. The method of claim 1, wherein the at least one action comprises load-balancing at least a portion of traffic in a selected portion of the communication network.

4. The method of claim 1, wherein the at least one action comprises offloading at least a portion of traffic in a selected portion of the communication network.

5. The method of claim 1, wherein the at least one action comprises applying a denial-of-service mitigation measure in a selected portion of the communication network.

6. The method of claim 1, wherein the at least one action comprises re-directing a uniform resource locator request of the additional user to a different uniform resource locator based on the output of the machine learning model.

7. The method of claim 1, wherein the at least one action comprises changing a configuration of a network element of the communication network to restrict access of the additional user based on the output of the machine learning model.

8. The method of claim 1, wherein the at least one action comprises at least one of:
    allocating at least one additional resource of the communication network; or
    removing at least one existing resource of the communication network.

9. The method of claim 1, wherein the plurality of user interaction data comprises two or more of a plurality of uniform resource locators, call records, or in-store interaction logs.

10. The method of claim 1, wherein the token score for each user interaction data is determined based on an application of Bayes' theorem.

11. The method of claim 1, wherein the portion of the at least one user interaction data from the relevant subset of user interaction data that is removed comprises sensitive user information.

12. The method of claim 1, wherein the relevant subset of user interaction data is determined for each category of user interaction data before being compressed.

13. The method of claim 1, wherein the target category comprises detecting fraud.

14. The method of claim 1, wherein the target category comprises detecting user churn.

15. The method of claim 1, wherein the target category comprises users associated with a utilization of a network resource of the communication network.

16. The method of claim 1, wherein the target category comprises users associated with an accessing of a particular data content or a type of data content via the communication network.

17. The method of claim 1, wherein the machine learning model comprises a recurrent neural network.

18. An apparatus comprising:
a processing system including at least one processor; and
a computer-readable medium storing instructions which, when executed by the processing system, cause the processing system to perform operations, the operations comprising:
identifying a plurality of user interaction data associated with a target category of a plurality of users of a communication network;
identifying a relevant subset of user interaction data from the plurality of user interaction data, wherein the identifying the relevant subset of user interaction data comprises:
generating a token score for each user interaction data in the plurality of user interaction data; and
selecting a top N number of user interaction data from the plurality of user interaction data that has a respective token score above a threshold;
compressing the plurality of user interaction data to the relevant subset of user interaction data, wherein the compressing comprises:
removing user interaction data having a respective token score below the threshold and removing a portion of data from at least one user interaction data from the relevant subset of user interaction data;
training a machine learning model with the relevant subset of user interaction data that are indicative of the target category;
obtaining additional user interaction data associated with an additional user;
identifying a relevant subset of the additional user interaction data;
applying the relevant subset of the additional user interaction data as an input to the machine learning model that has been trained;
obtaining an output of the machine learning model quantifying a measure of which the relevant subset of the additional user interaction data is indicative of the target category; and
performing at least one action in the communication network responsive to the measure of which the relevant subset of the additional user interaction data is indicative of the target category.

19. A non-transitory computer-readable medium storing instructions which, when executed by a processing system including at least one processor, cause the processing system to perform operations, the operations comprising:
identifying a plurality of user interaction data associated with a target category of a plurality of users of a communication network;
identifying a relevant subset of user interaction data from the plurality of user interaction data, wherein the identifying the relevant subset of user interaction data comprises:
generating a token score for each user interaction data in the plurality of user interaction data; and
selecting a top N number of user interaction data from the plurality of user interaction data that has a respective token score above a threshold;
compressing the plurality of user interaction data to the relevant subset of user interaction data, wherein the compressing comprises:
removing user interaction data having a respective token score below the threshold and removing a portion of data from at least one user interaction data from the relevant subset of user interaction data;
training a machine learning model with the relevant subset of user interaction data that are indicative of the target category;
obtaining additional user interaction data associated with an additional user;
identifying a relevant subset of the additional user interaction data;
applying the relevant subset of the additional user interaction data as an input to the machine learning model that has been trained;
obtaining an output of the machine learning model quantifying a measure of which the relevant subset of the additional user interaction data is indicative of the target category; and
performing at least one action in the communication network responsive to the measure of which the relevant subset of the additional user interaction data is indicative of the target category.

20. The apparatus of claim 18, wherein the at least one action comprises re-routing at least a portion of traffic in a selected portion of the communication network.

* * * * *